(12) United States Patent
Lovett

(10) Patent No.: US 7,347,361 B2
(45) Date of Patent: Mar. 25, 2008

(54) SYSTEM, METHOD AND PROGRAM PRODUCT FOR ACCOUNT TRANSACTION VALIDATION

(76) Inventor: Robert Lovett, 140 Sherry Lynn Dr., Finger, TN (US) 38334

( * ) Notice: Subject to any disclaimer, the term of this patent is extended or adjusted under 35 U.S.C. 154(b) by 38 days.

(21) Appl. No.: 11/484,081

(22) Filed: Jul. 11, 2006

(65) Prior Publication Data

US 2006/0278698 A1   Dec. 14, 2006

Related U.S. Application Data

(63) Continuation-in-part of application No. 11/445,553, filed on Jun. 2, 2006.

(60) Provisional application No. 60/689,576, filed on Jun. 13, 2005.

(51) Int. Cl.
*G06K 5/00* (2006.01)

(52) U.S. Cl. ............... 235/380; 235/382; 235/383

(58) Field of Classification Search ........... 235/380, 235/382, 383; 705/39, 44
See application file for complete search history.

(56) References Cited

U.S. PATENT DOCUMENTS

| | | | |
|---|---|---|---|
| 5,450,491 A * | 9/1995 | McNair ............... | 713/184 |
| 5,789,732 A * | 8/1998 | McMahon et al. ....... | 235/487 |
| 5,872,834 A * | 2/1999 | Teitelbaum ........... | 379/93.03 |
| 5,939,699 A * | 8/1999 | Perttunen et al. ...... | 235/462.01 |
| 6,073,840 A | 6/2000 | Marion | |
| 6,089,284 A | 7/2000 | Kachler et al. | |
| 6,098,879 A | 8/2000 | Terranova | |
| 6,116,505 A | 9/2000 | Withrow | |
| 6,422,464 B1 | 7/2002 | Terranova | |
| 6,470,233 B1 | 10/2002 | Johnson | |
| 6,519,329 B1 | 2/2003 | Hjelmvik | |
| 6,529,880 B1 | 3/2003 | McKeen et al. | |
| 6,574,603 B1 | 6/2003 | Dickson et al. | |
| 6,587,835 B1 | 7/2003 | Treyz et al. | |
| 6,687,346 B1 * | 2/2004 | Swartz et al. ........ | 379/93.12 |
| 6,714,918 B2 | 3/2004 | Hillmer et al. | |
| 6,940,393 B2 | 9/2005 | Dev et al. | |
| 6,947,571 B1 | 9/2005 | Rhoads et al. | |
| 6,969,002 B2 * | 11/2005 | Creamer et al. ...... | 235/462.15 |
| 6,980,970 B2 | 12/2005 | Krueger et al. | |
| 6,991,155 B2 * | 1/2006 | Burchette, Jr. .......... | 235/379 |
| 7,014,109 B2 | 3/2006 | Hjelmvik | |
| 7,209,903 B1 * | 4/2007 | Mamdani et al. ......... | 705/75 |
| 2001/0051531 A1 | 12/2001 | Singhal et al. | |
| 2002/0085515 A1 | 7/2002 | Jaynes et al. | |
| 2004/0148253 A1 * | 7/2004 | Shin et al. ............. | 705/39 |

* cited by examiner

*Primary Examiner*—Ahshik Kim
(74) *Attorney, Agent, or Firm*—James Richards

(57) ABSTRACT

A system, method and program product for account transaction validation which may be downloaded or otherwise installed on a networked computing device such as a cell phone or other networked computing device. The networked computing device provides an encrypted validation code to a merchant for each transaction. The validation code is uniquely computed for each transaction and may be based on transaction time and/or other transaction data. The code algorithm is unique for each cardholder. Only the bank transaction center has knowledge of the particular algorithm for each cardholder. When transaction details such as transaction dollar amount are included in the generation of the code, the code may be used to validate the reported transaction dollar amount. An algorithm is disclosed for generating a unique code based on time and/or transaction dollar amount.

19 Claims, 18 Drawing Sheets

SYSTEM, METHOD AND PROGRAM PRODUCT FOR ACCOUNT TRANSACTION VALIDATION

RELATED APPLICATIONS

This application is a continuation in part of U.S. patent application Ser. No. 11/445,553, Titled "System, Method and Program Product For Credit Card Transaction Validation," filed Jun. 2, 2006 by Robert Lovett, which claims the benefit under 35 U.S.C 119(e) of US Provisional Application 60/689,576, filed Jun. 13, 2005 by Robert Lovett, all of which are incorporated herein by reference in their entirety.

FIELD OF THE INVENTION

This invention relates to account transactions, and more particularly to the validation of credit card and other account transactions.

BACKGROUND OF THE INVENTION

There have been many attempts to prevent the illegal use of credit cards in shopping malls, by telephone, Internet and especially Automated Teller Machines (ATM).

These efforts include Personal Identification Numbers (PIN) the use of mother's maiden names as a secret identification, and requiring credit card holders to use additional ID cards such as a driver license. All attempts to use static information have drawbacks since they are easily learned and passed on to other users. Once the static identification number is learned, it may be used to make fraudulent credit card purchases until the fraud is detected and the credit card account is closed.

Today, each purchase using a credit card, where the credit card is not present such as for internet or telephone transactions, must be accompanied by an additional security number, designated the CVV (card verification and validation) number. The CVV number may be alternatively called CVV2 or CID (card identification) or CCV (credit card verification or validation) by various credit card companies. The CVV number is typically on the back of the credit card, as with Master Card or Visa, but may be on the front of the card, as with American Express. The CVV number typically uses three digits, but may use four as with American Express. Merchants are not allowed to store CVV numbers in their database with the credit card number as a security measure. Because CVV numbers are not in the merchant's database, CVV numbers will not be disseminated if a merchant's database is compromised, assuming the merchant follows the rules and does not record the CVV number. Since the CVV number is not in the database, each transaction must be accompanied by a new request for the CVV number from the cardholder.

However, since the CVV numbers are disclosed to the merchants, their employees, and anyone in the communications chain, they may easily be recorded and passed on.

Thus, there is a need for a system and method for securing credit card transactions that does not generate information that may be easily determined, circumvented or passed on to others and used to generate fraudulent transactions.

SUMMARY OF THE INVENTION

Briefly, the present invention provides a system, method and program product for account transaction validation which may be downloaded or otherwise installed on a networked computing device such as a cell phone or other networked computing device. The networked computing device provides an encrypted validation code to a merchant for each transaction. The validation code is uniquely computed for each transaction and may be based on transaction time and/or other transaction data. The code algorithm is unique for each cardholder. Only the bank transaction center has knowledge of the particular algorithm for each cardholder. When transaction details such as transaction dollar amount are included in the generation of the code, the code may be used to validate the reported transaction dollar amount. An algorithm is disclosed for generating a unique code based on time and/or transaction dollar amount.

It is thus an object of the present invention to provide a system that cannot be easily determined, circumvented or passed on to other users.

It is a further object of the present invention to provide a low cost system that is easy to manufacture in large numbers yet customized to each individual user.

One embodiment of the present invention generates a validation number using a set of code variables unique to each device, the set of code variables being known by the authorization center's computer.

One embodiment of the present invention generates a time dependent coded validation number which utilizes the device's existing clock.

A further embodiment generates the coded validation number based on a coded clock table with a coded value for each minute and each hour, the coded values being known by the authorization center's computer.

One embodiment of the present invention may maintain time synchronization with the credit card authorization central computer.

One embodiment of the present invention each credit card protection device may be linked to a single credit card holder with one or more credit cards.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1A:
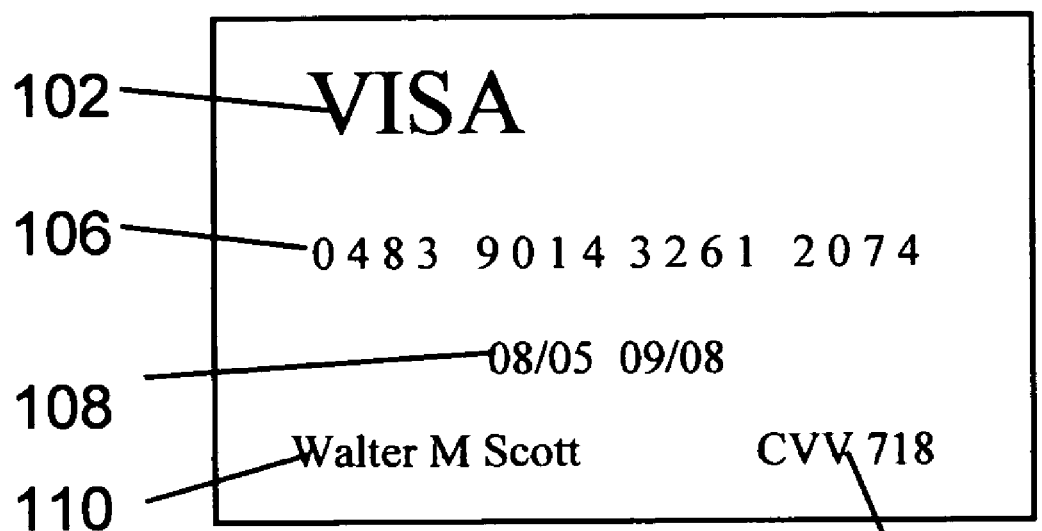
FIG. 1A illustrates an exemplary display for a credit card on a computing device.

The detailed description explains the preferred embodiments of the invention, together with advantages and features, by way of example with reference to the drawings.

DETAILED DESCRIPTION OF THE INVENTION

The present invention is for a cell phone networked device or other networked device for generating credit card protection codes and assisting in efficient transaction processing.

The present invention overcomes the vulnerability of the static CVV number by providing an encrypted CVV code which is newly computed for each new card transaction. A code calculation is never reused for a different transaction. Thus, the merchant, or anyone else observing the transaction would be unable to duplicate the transaction or generate another transaction with the information provided. Any attempt to re-use the CVV code would generate a security alert which could be provided at the time of the fraudulent transaction. As a further benefit of the present invention, a cardholder may use a PIN to enable the device to generate the CVV code, protecting the device from loss or theft. As a further benefit, the transaction amount may be used in addition to time to generate the CVV code, thus validating the amount entered by the merchant, thus preventing an unauthorized amount from being sent to the card processing center. Since the invention utilizes the CVV number structure that is already in place, little change is required in the field equipment now in place. Store equipment to read and process credit cards and communicate with the card processing center is unchanged. Each cardholder may utilize new software installed on a cell phone or other device, and the card processing centers may add software to perform the additional processing. Regular credit cards may be processed as before with no change to the equipment.

The present invention envisions the use of a multi-function cell phone which may include web and music downloading features, may allow storing of notes, exchange of pictures, and may include the storage of credit card information, eliminating the plastic. In accordance with the present invention, such multi-function cell phone device, however, may include more capability than simply storing credit card information. The cell phone device may compute encrypted validation codes (CVV codes) to improve credit card security. Further, the cell phone device may display a barcode having the complete credit card information including the computed encrypted validation code. The barcode may be read by a merchant's terminal device, eliminating transcription errors. Further features of the cell phone device may include the entry of a PIN to activate the credit card information, providing security in the case of a stolen cell phone. The stolen cell phone credit card information may be quickly disabled by calling the cell phone and providing a disabling code. In one embodiment, the cell phone device may include a fingerprint reader to provide alternate user validation and eliminate the need to enter the PIN, simplifying and speeding sales transactions.

The present invention generates an encrypted time dependent validation code (CVV code) to validate each transaction. The CVV code may be preferably three or four characters long and may be transmitted in place of the CVV validation number presently in use and thus may utilize much of the same card processing equipment and infrastructure presently in place. In accordance with one embodiment of the invention, the credit card may be a virtual credit card (VCC), which may exist entirely within a computer or network and have no physical plastic embodiment. The virtual credit card exists as a software program on a computer and can be referenced by using the computer display. In a conventional credit card, the information is static, whether embossed, printed or written into the magnetic stripe. The virtual credit card program can include dynamic and computed information. In particular, the virtual credit card can compute an encrypted validation code with significant security advantages. The virtual credit card may also use improved identification features to insure the authorized owner of the card is present. In particular, the VCC may require entry of a PIN to reference the card. In advanced cards, a fingerprint reader may be installed to obviate the need for entry of the PIN and speed the transaction process. In one embodiment, a traditional credit card may have a virtual credit card capability and may be usable with the static CVV number and/or the encrypted CVV code as the user may select.

In a further embodiment, the VCC may be networked and the network connection may be used in part of the validation process. The network may be a cell phone network, telephone network, or computer network like, for example, the Internet.

FIG. 1A illustrates an exemplary display for a credit card on a computing device. Referring to FIG. 1A, the display is presented on the screen of the computing device, which may be a cell phone or other device, preferably a personal and portable, hand held computing device. Information is displayed in a rectangular format simulating a plastic credit card so that the different types of information are easily identified by one familiar with plastic credit cards. Information includes a type of card 102, a card number 106, expiration date 108, name of a cardholder 110, and a static CVV number 112. The static CVV number may be more typically located on the back of a plastic card, but is shown on the screen within the rectangle for convenience. The static CVV number shown in FIG. 1A is the static CVV number that would be displayed on the back of an associated the plastic card embodiment and may be displayed in one embodiment of a display for the credit card stored in the computing device.

Figure 1B:
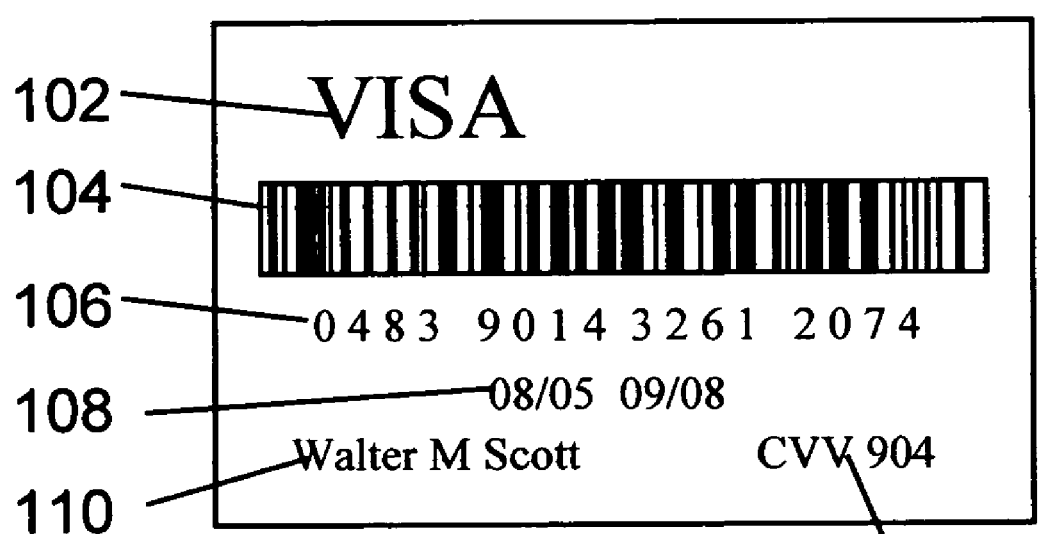
FIG. 1B illustrates an exemplary display for credit card information including a bar code and an encrypted CVV code in accordance with the present invention.

FIG. 1B illustrates an exemplary display for credit card information including a bar code and an encrypted CVV code in accordance with the present invention. The display of FIG. 1B may be shown on the screen of the computing device in accordance with the present invention. The display of FIG. 1B includes the information of FIG. 1A and further includes a bar code 104. The bar code 104 information may include the card number 106, expiration date 108 and encrypted CVV code 114. The encrypted CVV code 114 shown in FIG. 1B may be a time dependent encrypted CVV code 114. The use of the bar code 104 permits rapid automatic transcription of all pertinent credit card data, eliminating errors and improving speed and convenience. The encrypted CVV code 114 improves the security of a transaction validation process.

Figure 2:
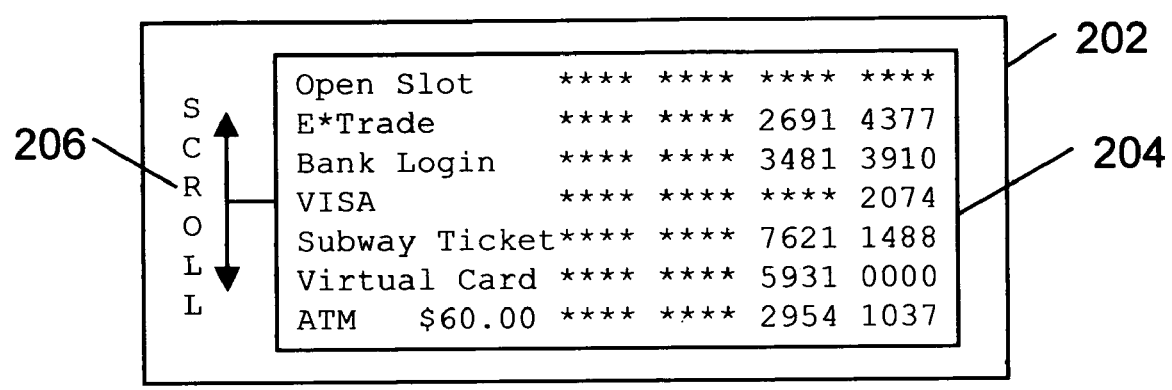
FIG. 2 illustrates an exemplary display showing the selection of transaction types and hosts available.

FIG. 2 illustrates an exemplary display showing the selection of transaction types and hosts that may be available. Referring to FIG. 2, the display 202 may be shown as part of the screen on a cell phone or other device and may be shown separately or in conjunction with the display of FIG. 1B. The display 202 of FIG. 2 shows a menu 204 of transaction types and allows scrolling 206 through the menu to select the desired transaction type. The illustrated transaction types 204 include E-Trade® account, Bank account, VISA® credit card, subway ticket, Virtual Credit Card, or ATM account. Certain other accounts and types of transactions may be included as well. Each account is set up with its own PIN number and static CVV number 112 or equivalent. Further, each account may include its own set of coding variables for encryption of time and other information, and/or may include its own specific encryption method.

Figure 3:
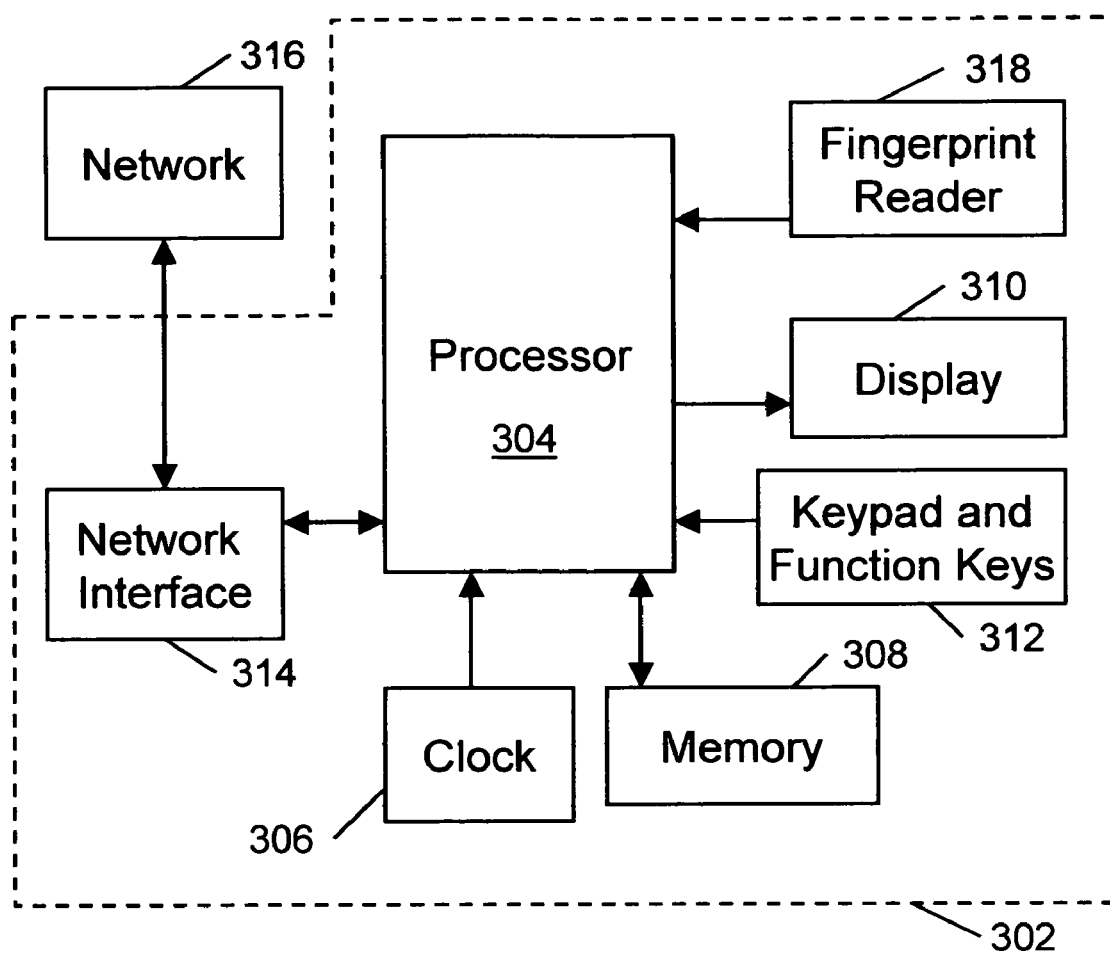
FIG. 3 is an exemplary system block diagram for a networked computing device in accordance with the present invention.

FIG. 3 is an exemplary system block diagram for a networked computing device in accordance with the present invention. The network 316 is preferably a cell phone network and the networked computing device 302 is preferably a cell phone. The networked computing device 302 typically includes one or more processors 304 coupled to memory 308. Typically the memory 308 may include several types of different densities and speeds and may be volatile and nonvolatile. The processor 304 is coupled to a clock 306 providing the time of day and date. The processor 304 typically displays information on a display 310 such as an LCD display and typically has a keypad 312 for entry of numbers and selection of modes. The processor 304 is connected to the network 316 through a network interface 314 for connection to a bank or other processing center (not shown). The network interface 314 may be a cell phone or cell phone module for connection to a cell phone network or wireless LAN (local area network) device for connection to a digital network. The network 316 may be used for downloading card information and/or coding information, and for making or validating transactions. The network 316 may also provide voice communications for the cell phone 302 and/or may provide the date and time of the device clock 306. In a preferred alternative embodiment, the computing device may include a fingerprint reader 318. The fingerprint reader may be used in place of the PIN for cardholder identification.

Figure 4:
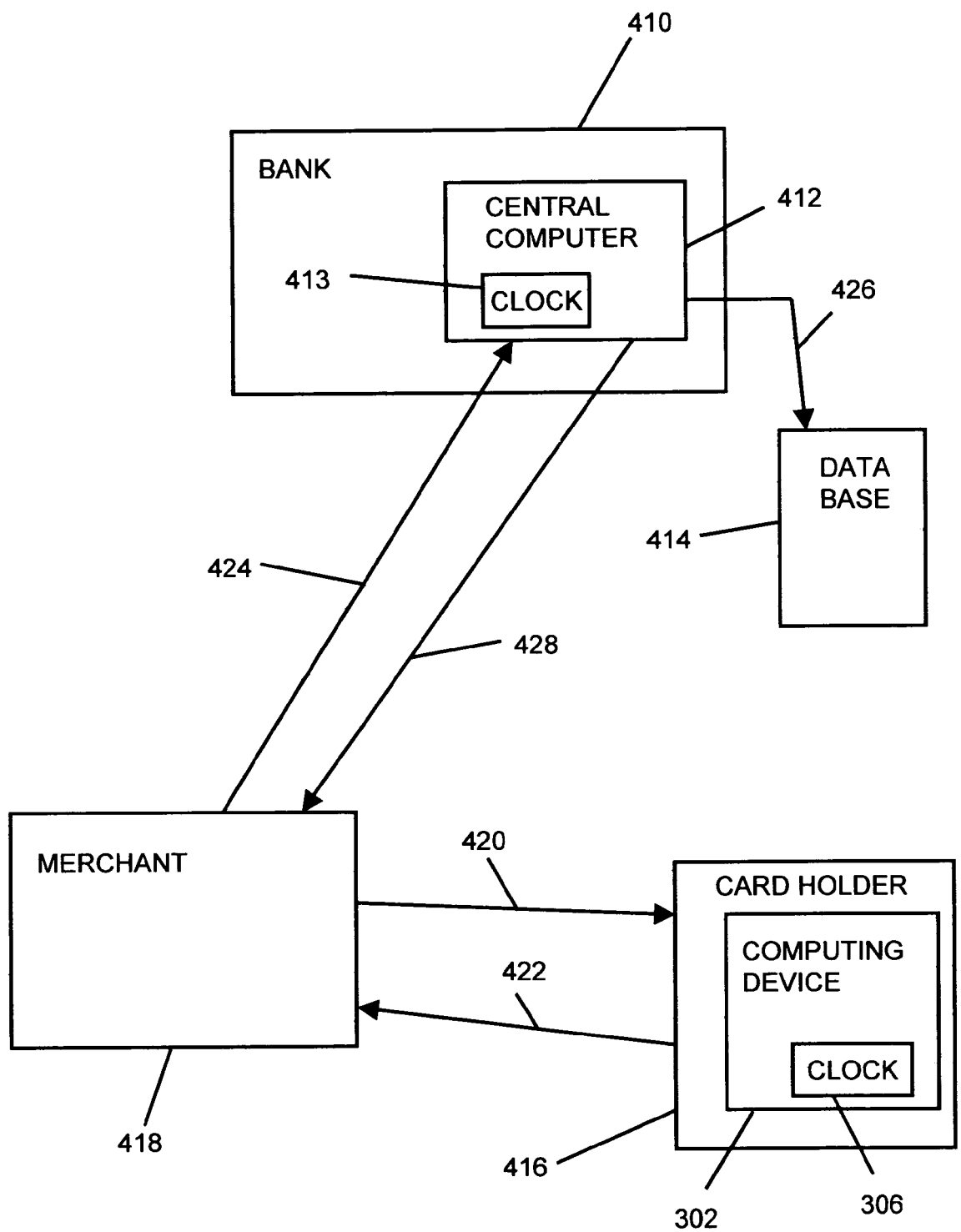
FIG. 4 is a schematic diagram of a system using the present invention.

FIG. 4 is a schematic diagram of a system using the present invention. The system includes a financial institution shown in FIG. 4 and referred to hereafter as bank 410. The bank 410 includes a central computer 412 connected to a database 414 in which credit card accounts are maintained. The central computer 412 further includes a bank clock 413. Also included in the system of FIG. 4, is a cardholder 416 whose credit card account is held by the bank 410. The cardholder 416 has a computing device 302 of the present invention to protect the cardholder's credit card account by providing encrypted CVV codes 114 for each transaction. The computing device 302 also includes a clock 306 used to validate transactions, as will be discussed. The system of FIG. 4 also includes a merchant 418 who supplies products or services to the cardholder 416, and who presents authorized charges to the bank 410 to be charged to the cardholder's credit card account.

As illustrated in FIG. 4, the merchant 418 presents at 420, a bill for goods or services to the card holder 416 which includes the amount to be paid by the card holder 416. The cardholder 416 enters the amount to be paid into the computing device 302. The computing device 302 then calculates the encrypted CVV code 114. The computing device may use, for example, a combination of the PIN of the card holder, the time on the clock 306, and the amount to be paid, and the static CVV code 112 to compute the coded CVV 114. The CVV code 114 is then displayed by the computing device. The cardholder then presents 422 the merchant with the cardholder's credit card information and the CVV code 114.

The merchant 418 then sends the credit card number of the cardholder 416, the amount charged, and the coded CVV 114, along with any other information needed to complete the transaction, to the bank 410 at 424. The bank 410 receives the data sent by the merchant 418, finds the account information for the credit card number in the database 414 for the card holder 416, and using the PIN from the database 414 and the amount reported by the merchant at 424, together with the transaction time and original static CVV number 112, validates the coded CVV 114. If the transaction is approved, an approval is sent from the bank to the merchant 418 as shown at 428, and the transaction is complete.

The cell phone clock 306 and bank clock 413 will normally be synchronized by the network, however, slight drift may occur if the cell phone is out of range of the network or for other similar reasons. The clock synchronization can be accomplished by analyzing the merchant's dollar value each time the credit card protection device is used. The merchant's price will be presumed to be accurate and legitimate, thus the time can be set by those values unless they are in conflict with computing device 302 by a larger margin than expected by the banks computer 412. During this synchronization process, the bank's computer 412 will keep a history on each computing device 302 and its model number in order to best predict its time drift at its next use.

If the cardholder 416 should lose the computing device 302, the cardholder will call the bank and the credit cards in the computing device 302 may be invalidated in the banks database 414. The bank may further send a message to the computing device 302 and disable credit card functions on the computing device 302.

If someone finds the lost computing device 302, the finder or attempted fraudulent user will be unable to access the credit card account since they must have knowledge of the PIN, and that PIN must be entered into the computing device prior to its use and acceptance by the bank's computer 412. After some number of failed attempts to fraudulently use the computing device 302, the bank's computer 412 will temporary disable or flag the account in the bank's computer database 414 until the rightful owner calls to report a loss or correct a mistake. If someone tries to fraudulently use the computing device 302 it will give no indication to the user until the banks processing center rejects the purchase back to the merchant which will take time and alert the bank to a possible fraudulent attempt.

Figure 5:
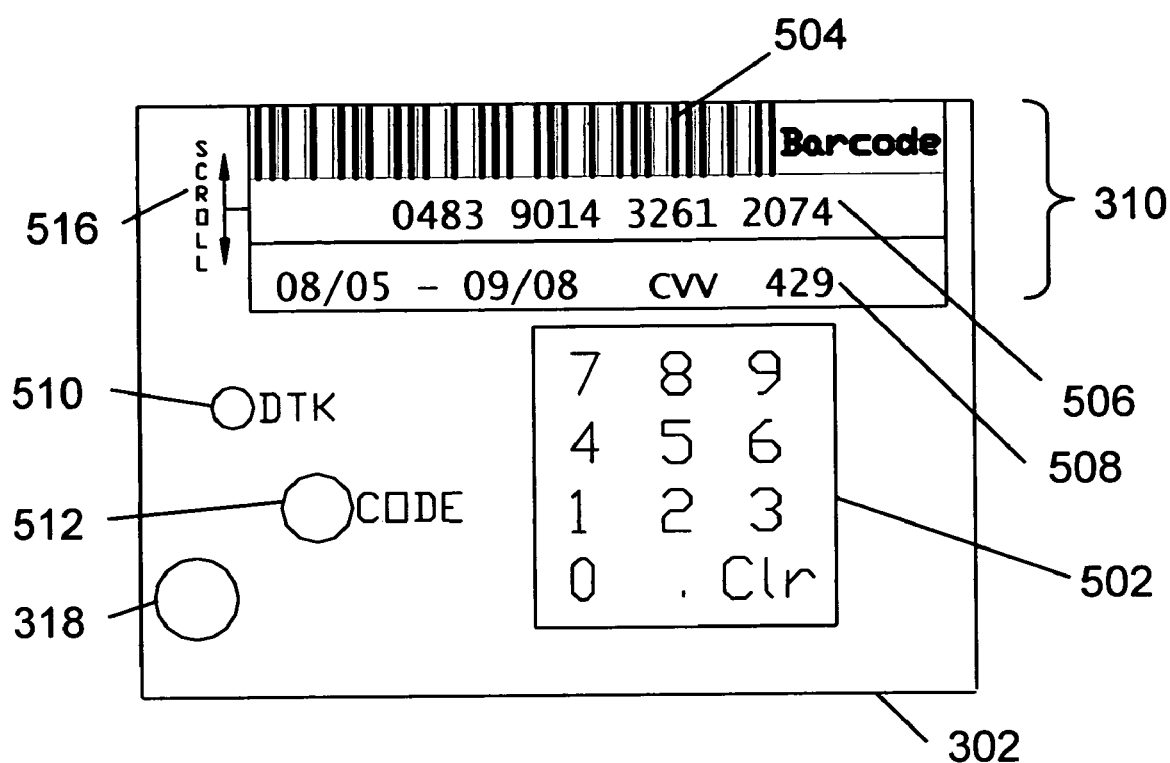
FIG. 5 illustrates the face of an exemplary computing device in accordance with the present invention.

FIG. 5 illustrates the face of an exemplary computing device in accordance with the present invention. The computing device 302 is preferably a networked computing device and preferably a cell phone or equivalent device. In one embodiment of the invention, the method is coded into a program that may be downloaded to one or more types of cell phones. Thus, the specific look of the face would be that of the cell phone and the look of the face and operation of the buttons may be somewhat different from the given example, yet embodying the teachings herein. The computing device of FIG. 5 comprises an LCD screen 310, a numeric keypad 502, at least two function buttons: the DTK button 510 and the Code button 512, and a fingerprint reader 318. The LCD screen 310 is shown displaying the credit card information in both barcode 504 format and numeric format 506, 508. A first numeric line 506 shows the credit card number. A second numeric line 508 shows the expiration date and CVV code 114. The barcode information 504 includes the credit card number, the expiration date, and the CVV code 114. The CVV code 114 is preferably the time dependent coded CVV 114 in accordance with the present invention. A scroll function 516 may be used to scroll through several available credit cards to select the desired credit card. The numeric keypad 502 is used for entering a PIN to enable the device or a particular credit card, or to enter a transaction amount, or other information. The Code key 512 initiates the calculation of the CVV code 114. The DTK key 510 is used to signify a duplicate transaction, i.e., the same transaction reentered because of some problem or fault. In a preferred embodiment, a fingerprint reader 318 may be used to enable the device or a particular credit card as an alternative to the PIN. Reading the fingerprint is quicker and simpler than keying in a PIN and does not require the cardholder to remember the PIN.

Figure 6:
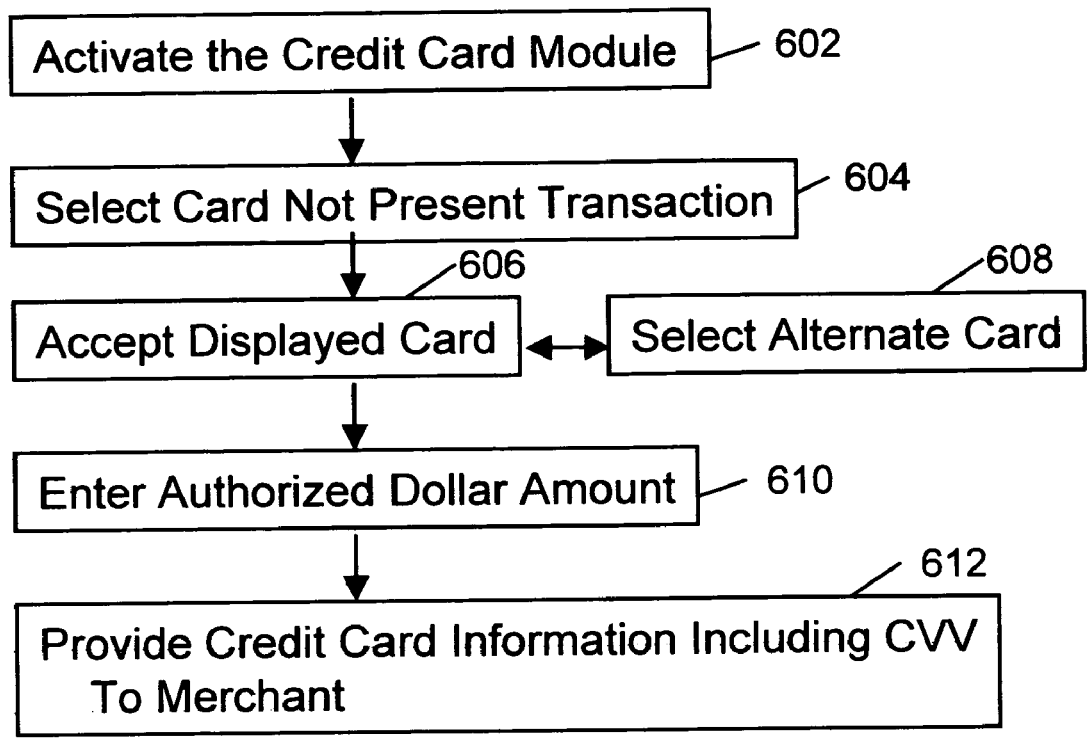
FIG. 6 illustrates a process for using the computing device of FIG. 5 to execute a credit card transaction.

FIG. 6 illustrates a process for using the computing device of FIG. 5 to execute a credit card transaction. Referring to FIG. 6, the cardholder first activates the credit card module 602. Activation may be done by entering the PIN or by pressing the finger against the fingerprint reader 318. In addition, the computing device 302 may have a special key or menu required to select a credit card mode among the many modes of the computing device 302. The next step is to select the mode of transaction 604, whether the transaction is a card not present transaction, or an over the counter transaction. A card not present transaction includes telephone or WEB purchases or other situations where the computing device is not available to be scanned by the merchant. Over the counter transactions include transactions where the merchant may scan the computing device screen with a barcode scanner.

If card not present transaction mode is selected, the next step is to select the credit card or transaction type 606. The screen will normally display the default credit card and no action is required to accept the default card. If another card is desired, the scroll function may be used to scroll through the available cards to select the desired one 608. Next, the transaction amount is entered 610. The code key, or equivalent function, may be pressed to generate the coded CVV 114, and the resulting coded CVV 114 and credit card information may be provided to the merchant 612. Entering the transaction amount enables the computing device to include information for validation of the transaction amount in the coded CVV 114.

Figure 7:
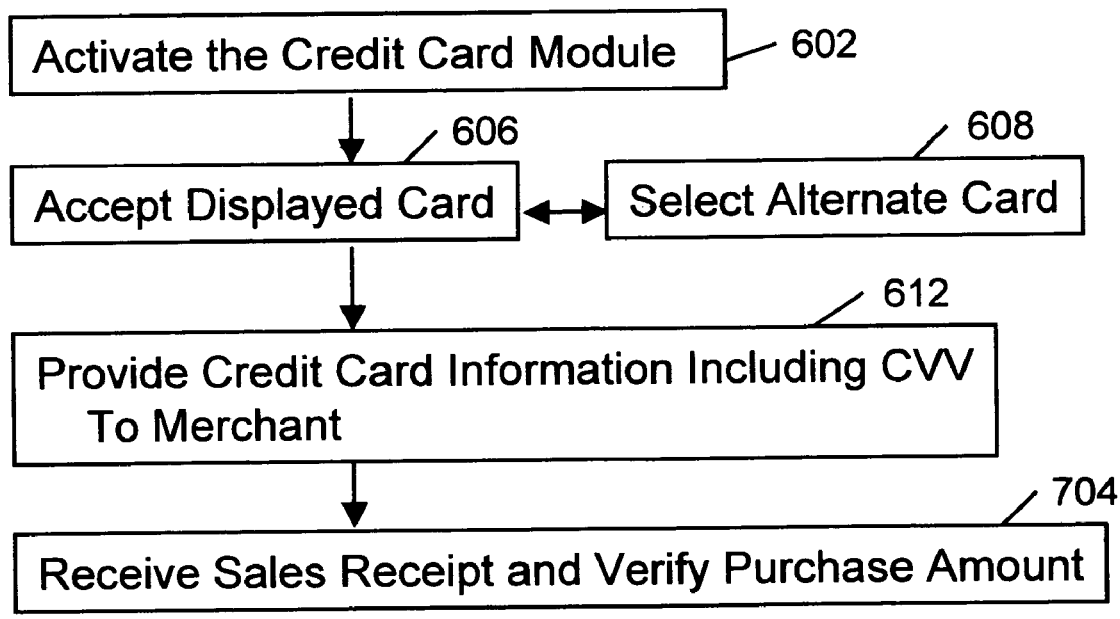
FIG. 7 illustrates a process for using the computing device of FIG. 5 to execute an over the counter credit card transaction.

FIG. 7 illustrates a process for using the computing device of FIG. 5 to execute an over the counter credit card transaction. Referring to FIG. 7, the cardholder first activates the credit card module 602 as previously described for FIG. 6. The computing device 302 then computes the coded CVV 114 and the cardholder then provides the results to the merchant 612. Merchants with a terminal equipped to read the barcode may simply scan the barcode to receive all of the credit card information. The numeric information may be transcribed manually or used to check the automatic barcode results. Since the cardholder will get a sales receipt 704 verifying the transaction amount, the step of entering the transaction amount to validate the transaction amount through the bank may add insufficient value to be worth the effort, however this may be done simply by selecting the card not present mode.

Generating A Time Dependent Coded CVV Code

Figure 8:
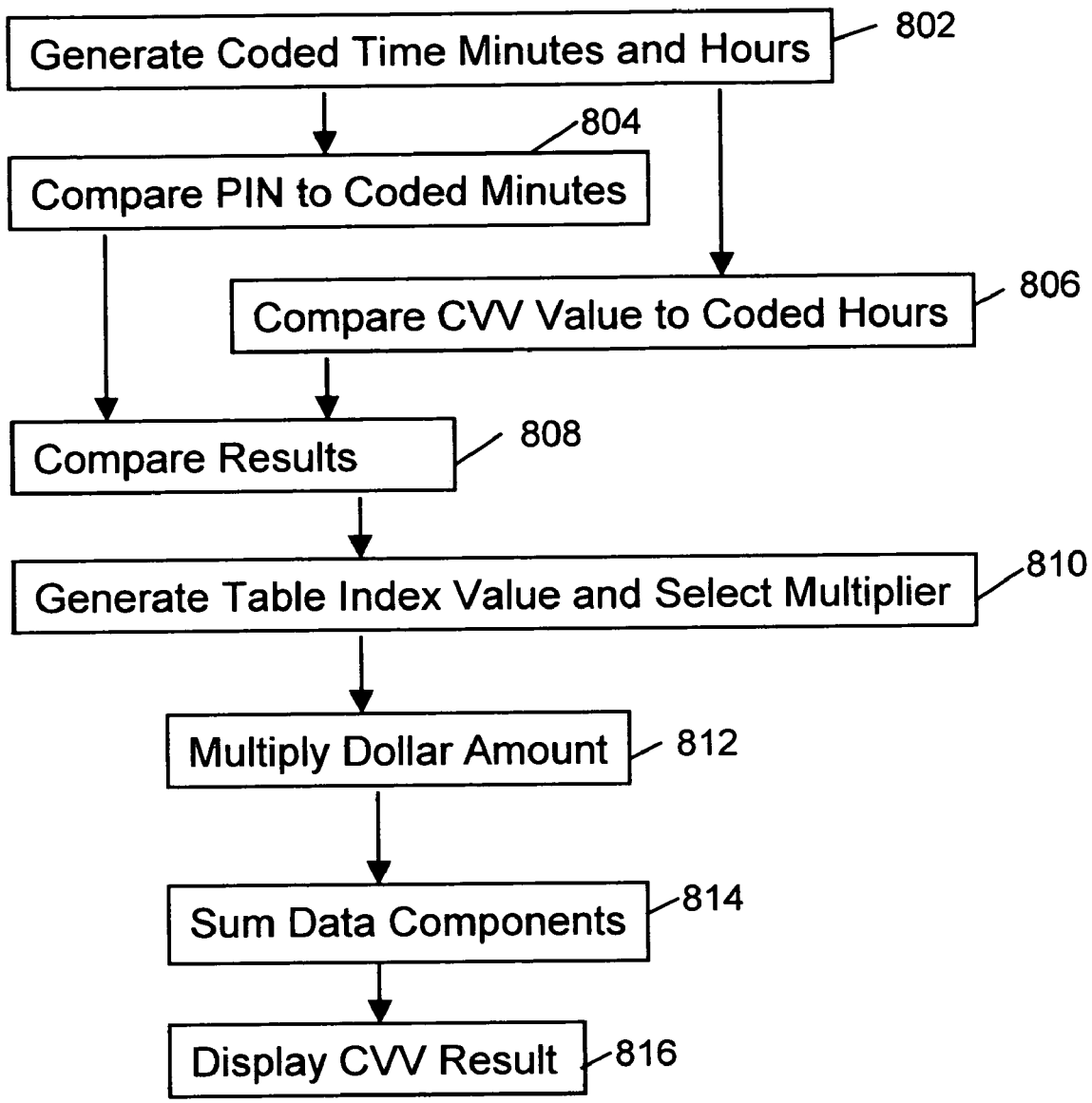
FIG. 8 shows an exemplary method for calculating an encrypted time dependent CVV code.

FIG. 8 shows an exemplary method for calculating an encrypted time dependent CVV code 114. Other methods may be used for encrypting the CVV 114 as are known in the art of data encryption. The encrypted CVV code 14 should not be easily decoded to produce an altered transaction or a fraudulent transaction. In accordance with the invention, the encrypted code value 114 should preferably be computed separately for each transaction so that the CVV code 114 cannot be reused successfully for a fraudulent transaction. One exemplary method of ensuring a change in CVV code 114 is to use a time value as part of the data or part of the process for encryption. A further method of improving security is to use a different set of code variables for each device. The code variables would be known only to the processing center so that only the processing center could validate the transaction. A further feature which may be included, where needed, is to encode or encrypt data such as the selling price to further validate the transaction, preventing changes along the communication path from the original sales clerk to the bank processing center.

Referring to FIG. 8, the current time is converted to coded time values 802. The cardholder's PIN is then compared to the coded minutes 804 and the static CVV number 112 is compared to the coded hour value 806. The first two comparison results are compared 808 and a table index value is determined 810. The index is used to find an algorithm multiplier from a unique table 810. The algorithm multiplier is used with the transaction dollar amount to derive a product 812. Then the time, date, PIN, static CVV number 112 and product 812 are summed 814. The result is the time dependent encrypted CVV code 114 to be given to the merchant 816 in place of the conventional static CVV number 112.

The present method utilizes a coded, or encrypted, clock, which is now described.

Figure 9A:
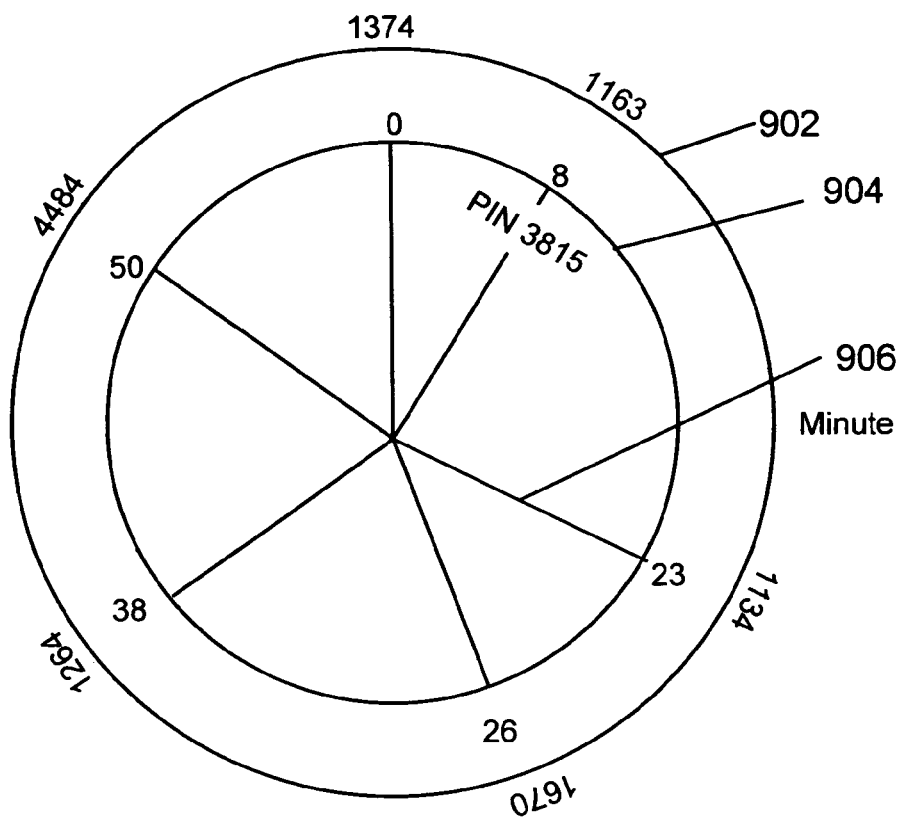
FIG. 9A and FIG. 9B illustrate an exemplary coded clock in accordance with the present invention.
Figure 9B:
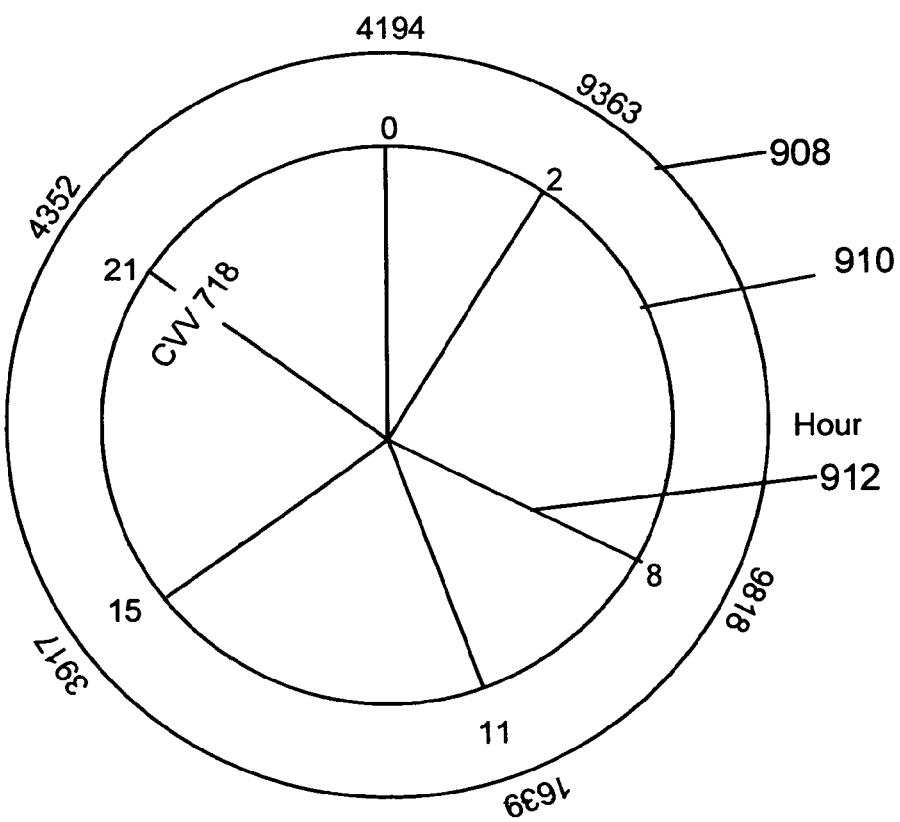

FIG. 9A and FIG. 9B illustrate an exemplary coded clock in accordance with the present invention. The clock of FIGS. 9A and 9B may be used, for example, for the exemplary VISA® card type shown displayed in FIG. 1A, FIG. 1B, FIG. 2, and FIG. 5. Referring to FIG. 9A, the set of circles 902, 904 represents a minute table. The inner circle 904 shows the minutes in an hour and the outer circle 902 shows a code minute value assigned to each respective minute. The set of sixty values corresponding to sixty minutes is different for each cell phone device and the values programmed into the computing device is known also by the bank transaction center. The radials 906 shown illustrate several exemplary minute values and corresponding code minute values. For the example calculation, the time is eight minutes after the hour, which has a corresponding code minute value of 1163. A PIN value of 3815 is compared with the code minute value of 1163.

The second set of circles, FIG. 9B, represents an hour table. The inner circle 910 shows the hours in a day and the outer circle 908 shows a code hour value assigned to each respective hour. The set of twenty four values corresponding to twenty four hours is different for each cell phone device and is known by the bank transaction center. The radials 912 shown illustrate several exemplary hour values and corresponding code hour values. For the example calculation, the time is twenty-one hours after midnight, which has a corresponding code hour value of 4352. A static CVV number of 718 is compared with the code hour value of 4352.

Further details of the coding process may be observed by following an example using the following exemplary data:

| | |
|---|---|
| Static CVV 112 printed on card | 718 |
| Cardholders PIN | 3815 |
| Merchant's Price | $673.00 |
| Year | 06 |
| Month | 04 |
| Day | 25 |
| Hour | 21 |
| Minute | 08 |

First, the coded minute is found using the minute table of FIG. 9A. For eight minutes past the hour, the coded minute table value is 1163. To compare the coded minute value and the card holders PIN, subtract the smaller value from the larger value to arrive at a positive result.

| | |
|---|---|
| 3815 | PIN |
| −1163 | Coded Minute Value |
| 2652 | First Result |

Second, the coded hour value is found using the hour table of FIG. 9B. For twenty-one hours, the coded hour value is 4352. The coded hour value is compared with the static CVV number 112 by subtracting the smaller value from the larger. Thus,

| | |
|---|---|
| 4352 | Coded hour value |
| −718 | CVV number |
| 3634 | Second Result |

The results are then compared by subtracting the smaller from the larger,

| | |
|---|---|
| 3634 | First Result |
| −2652 | Second Result |
| 982 | Final Comparison |

The index algorithm value is found from the final comparison by selecting the smallest and largest two digits in the final comparison and keeping the order of the two digits reading from left to right. The index algorithm in this example is 92. The index is used to select a multiplier from an index algorithm table.

Each cell phone device includes a unique index algorithm table of 99 entries. The table entries are known only by the card processing center. Each cell phone device has a different set of entries to produce a unique coded CVV 114 result for each different cell phone. The table entries may be loaded upon issue of the cell phone device or downloaded over the network as discussed above. Table 1 shows an exemplary table of multiplier entries. A partial listing of table entries is shown to indicate the general structure of the table and show entries actually used in the example. Referring to Table 1, the index ranges from 1 to 99. Each corresponding entry may be any number, but preferably a number between 0.01 and 1.0. For this example, entry 92 in the table is equal to 0.1028. The transaction amount is $673.00. Multiplying the transaction amount times the multiplier results in 673× 0.1028=69. Only the dollar portion of the transaction amount is used in this calculation.

TABLE 1

| Index | Multiplier |
|---|---|
| 1 | .0200 |
| 2 | .0233 |
| ... | ... |
| 14 | .0701 |
| 15 | .0381 |
| ... | ... |
| 92 | .1028 |
| ... | ... |
| 99 | .0810 |

Now the data can be summed. Thus:

| | |
|---|---|
| 718 | CVV number 112 printed on card |
| 38 | first two digits of cardholder's PIN |
| 15 | second two digits of cardholder's PIN |
| 69 | price × multiplier from Table 1, = 673 × 0.1028 |
| 06 | year |
| 04 | month |
| 25 | day |
| 21 | hour |
| +08 | minute |
| 904 | sum result used as new encrypted CVV code given to merchant. |

The date and time from a conventional Julian calendar/clock based on Universal Time (GMT) to make the time the same worldwide. If the sum result has more than the number of digits in the CVV number 112 used by the respective credit card company, the left digits may be deleted to truncate the number to the proper number of digits.

The bank transaction center may reverse the calculations to validate the total price. Thus, the total of

| | |
|---|---|
| 718 | CVV number 112 printed on card |
| 38 | first two digits of cardholder's PIN |
| 15 | second two digits of cardholder's PIN |
| 06 | year |
| 04 | month |
| 25 | day |
| 21 | hour |
| +08 | minute |
| 835 | sum |

The sum may be subtracted from the time dependent CVV of 904:

| 904 | Time dependent CVV |
|---|---|
| −835 | Sum from above |
| 69 | Remainder |

Using the time to determine the coded time values and index algorithm as above gives the multiplier times the merchant's reported transaction dollar amount:

0.1028×$673.00=69, which agrees with the remainder above and validates the transaction.

Thus described is a coding method that may produce a new encrypted CVV code 114 for each transaction to prevent the CVV code 114 from being copied and used by another party for a fraudulent transaction.

Other Transaction Types

FIG. 10 through FIGS. 19A and 19B illustrate different types of transactions involving different types of accounts. Each type of account provides a PIN number, or equivalent, and a static CVV number or equivalent, to the code generation process of FIG. 8. Each account may have a different associated clock table for use with the code generation process.

Figure 10:
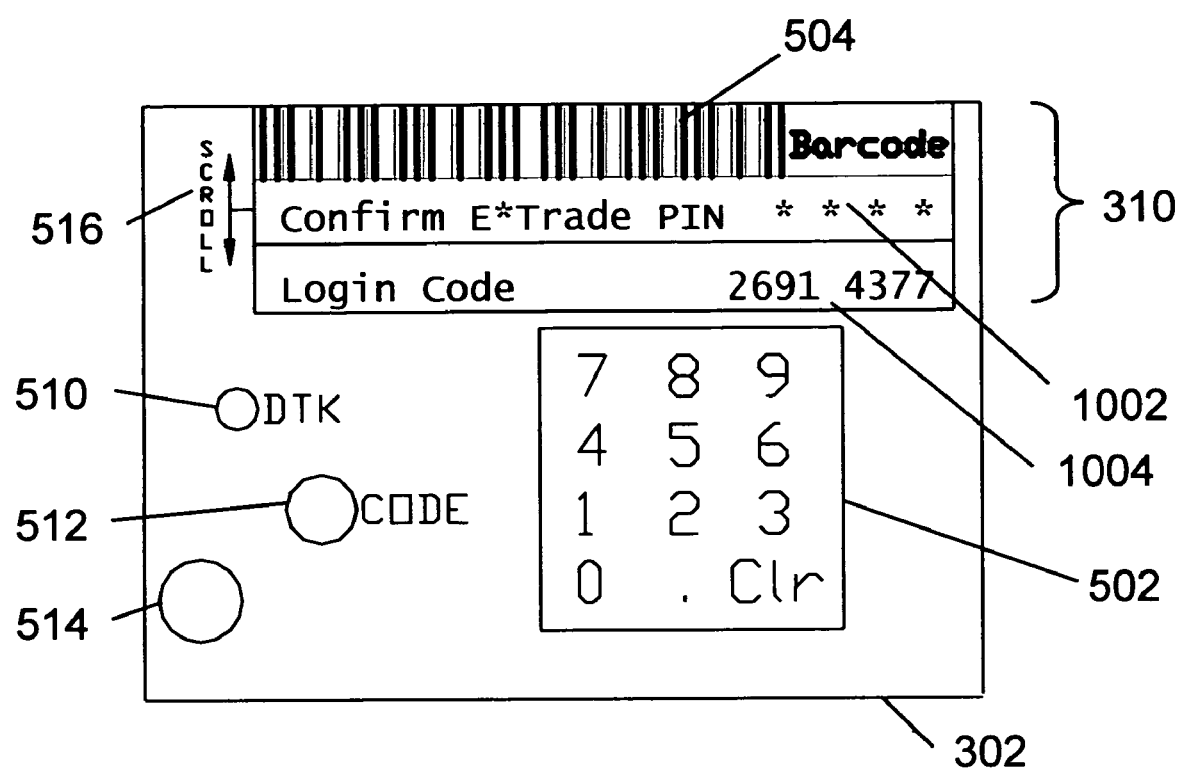
FIG. 10 illustrates the computing device of FIG. 5 with an E*Trade transaction selected.

FIG. 10 illustrates the computing device of FIG. 5 with an E*Trade transaction selected. Note that a specific E*Trade PIN may be required and a coded login code may be computed in place of the coded CVV 114.

Figure 11A:
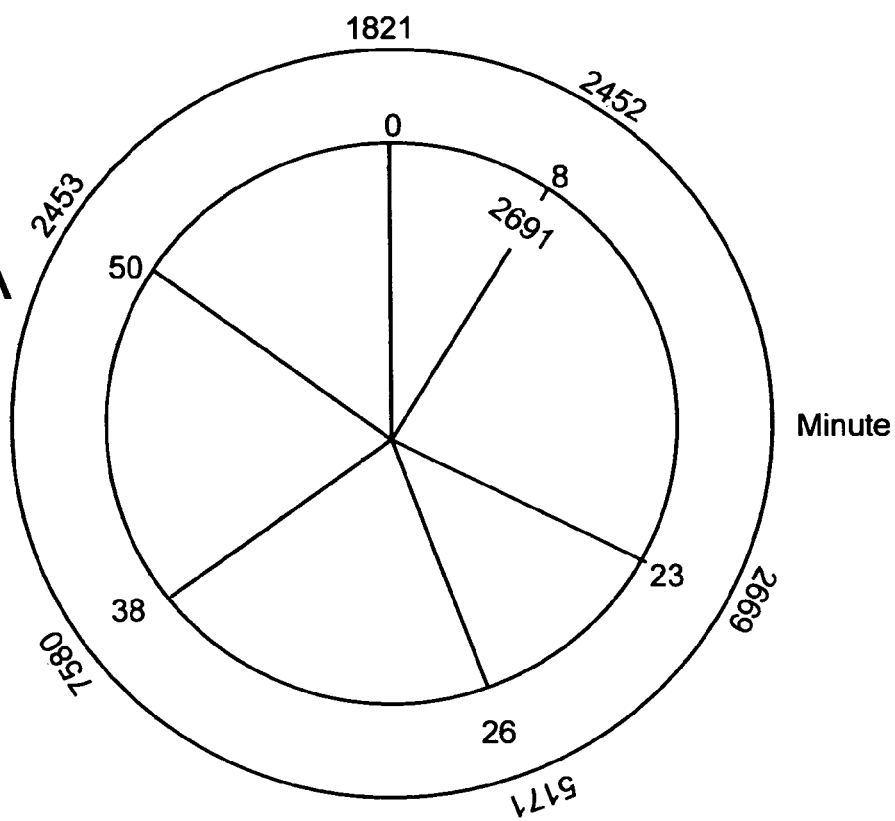
FIGS. 11A and 11B illustrate the code minute and code hour tables for the E*trade transaction of FIG. 10.
Figure 11B:
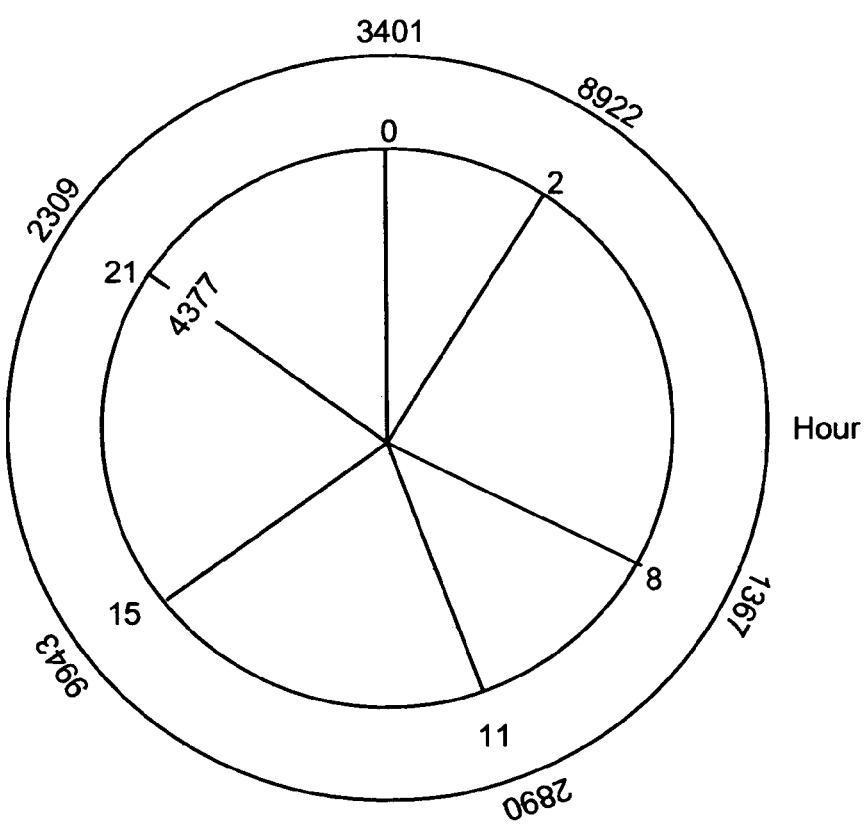

FIGS. 11A and 11B illustrate the code minute and code hour tables for the E*trade transaction of FIG. 10. Note that the clock tables are unique for E*Trade. The clock tables may further be unique for each cardholder or computing device.

Figure 12:
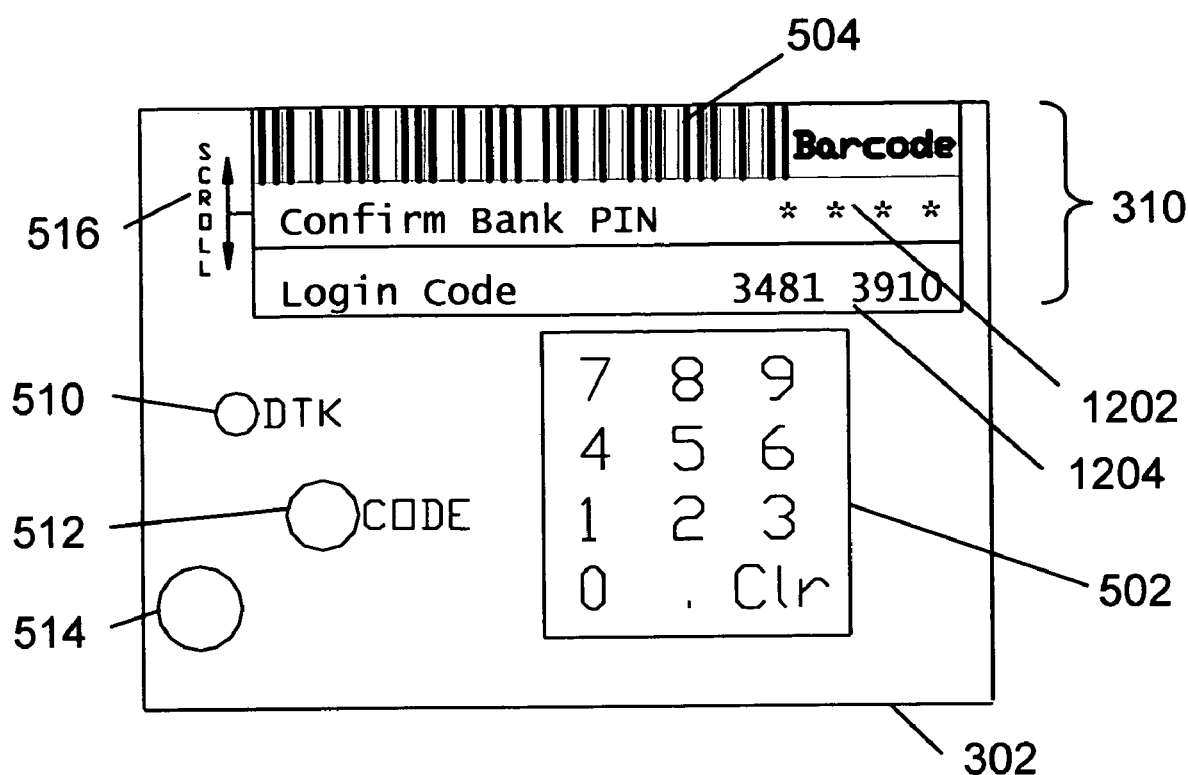
FIG. 12 illustrates the computing device of FIG. 5 with a Bank transaction selected.

FIG. 12 illustrates the computing device of FIG. 5 with a Bank transaction selected.

Figure 13A:
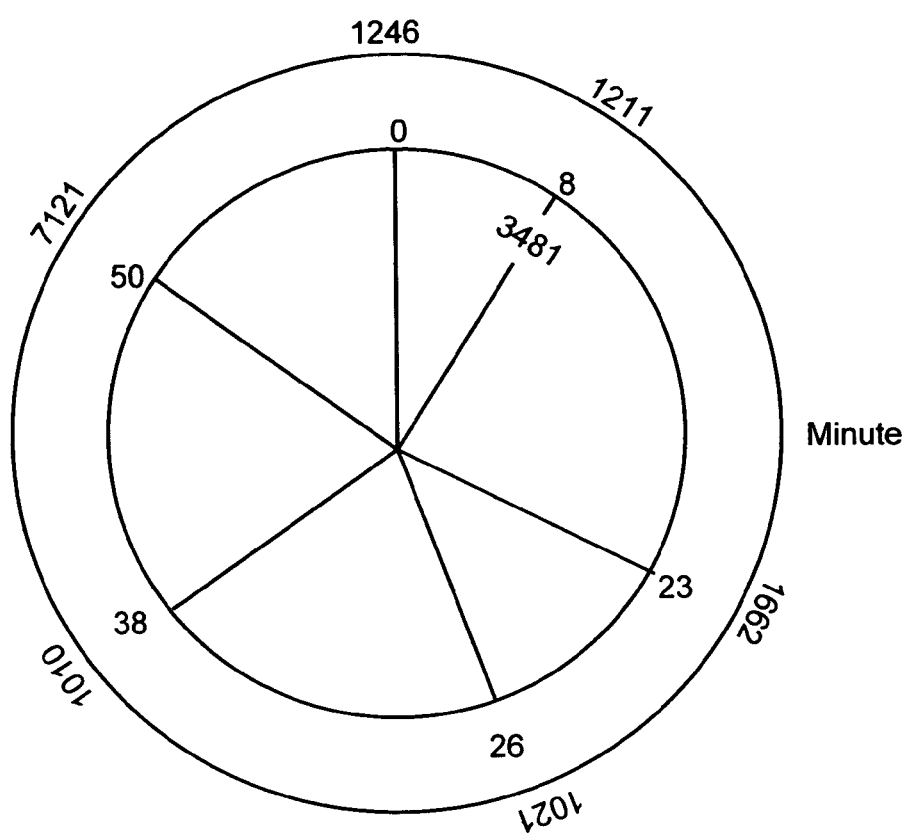
FIGS. 13A and 13B illustrate the code minute and code hour tables for the bank transaction of FIG. 12.
Figure 13B:
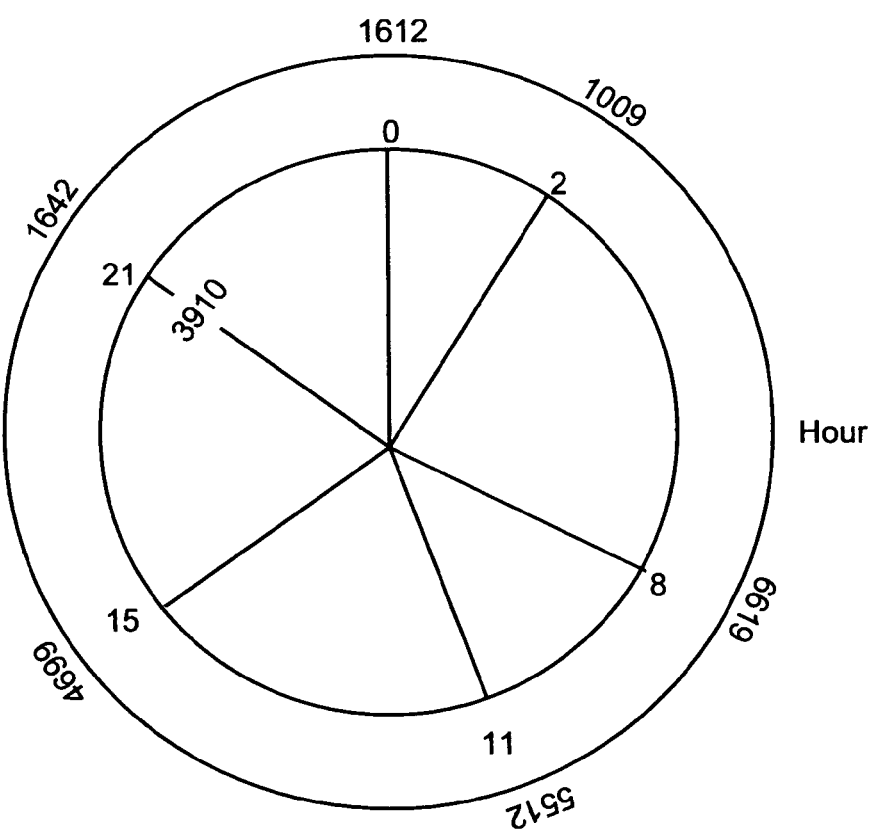

FIGS. 13A and 13B illustrate the code minute and code hour tables for the bank transaction of FIG. 12. Note that the clock tables are unique for the bank.

Figure 14:
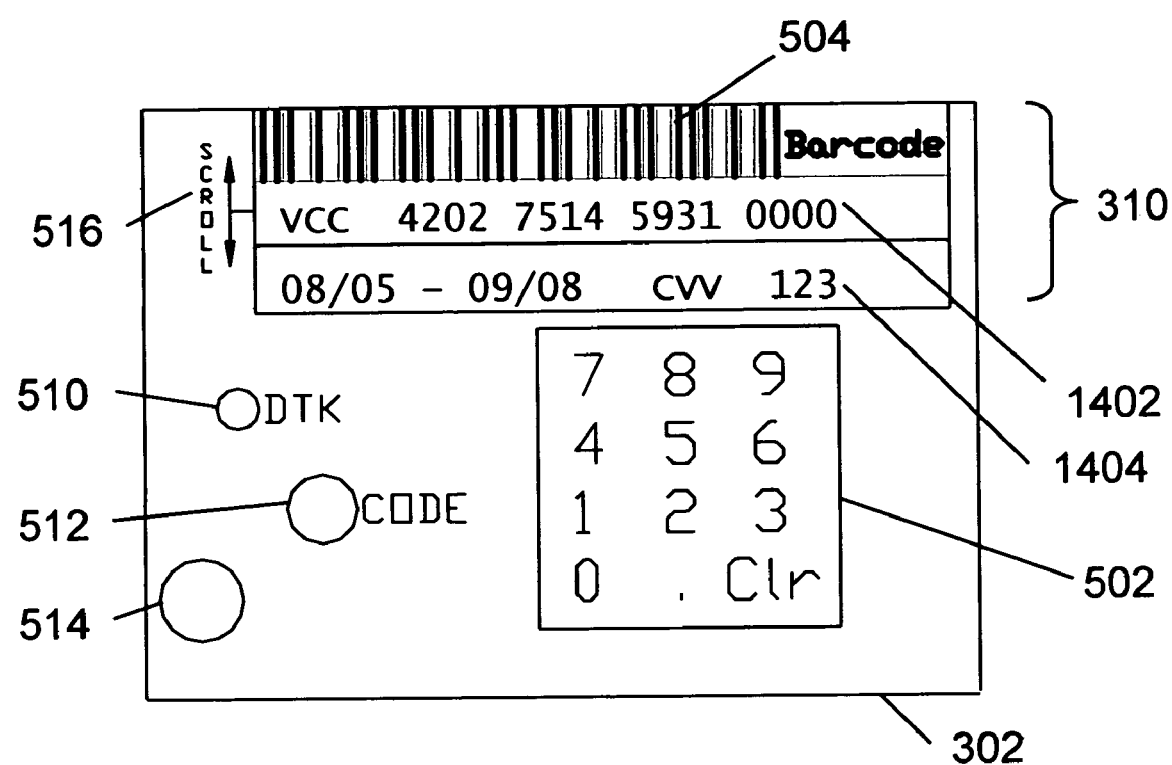
FIG. 14 illustrates the computing device of FIG. 5 with a Virtual Credit Card (VCC) transaction selected.

FIG. 14 illustrates the computing device of FIG. 5 with a Virtual Credit Card (VCC) transaction selected. The virtual credit card is a credit card that exists only as a software object and has no plastic embodiment. The VCC may have sixteen digits with the last four being zero to prevent its use except by cell phone device. The virtual credit card may be downloaded over the network and validated by phoning a special number, just as today's credit cards are validated. Billing will be by any desired method, typically by mail as presently used for plastic credit cards.

Figure 15A:
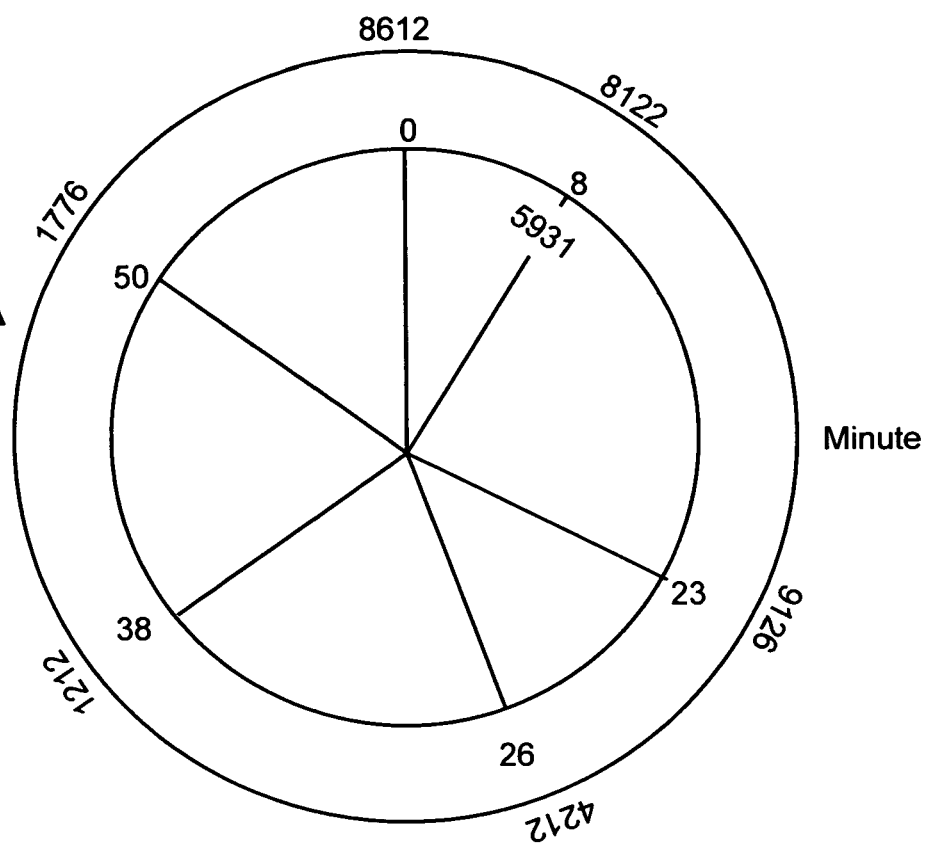
FIGS. 15A and 15B illustrate the code minute and code hour tables for the VCC transaction of FIG. 14.
Figure 15B:
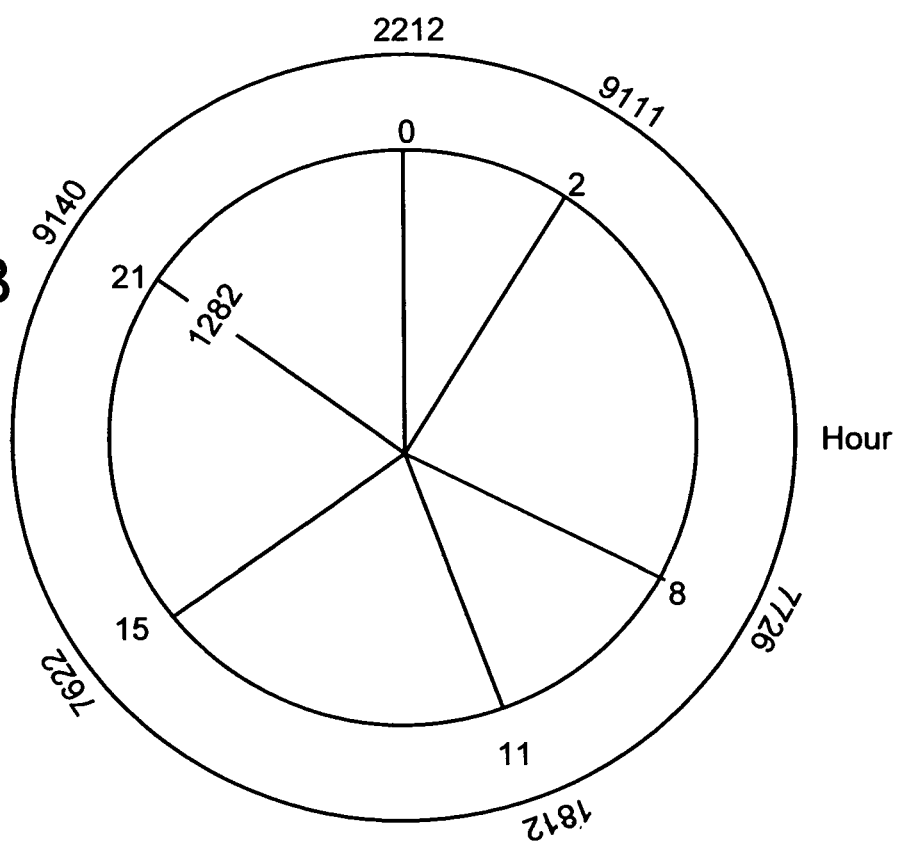

FIGS. 15A and 15B illustrate the code minute and code hour tables for the VCC transaction of FIG. 14. Note that the clock tables are unique for the VCC.

Figure 16:
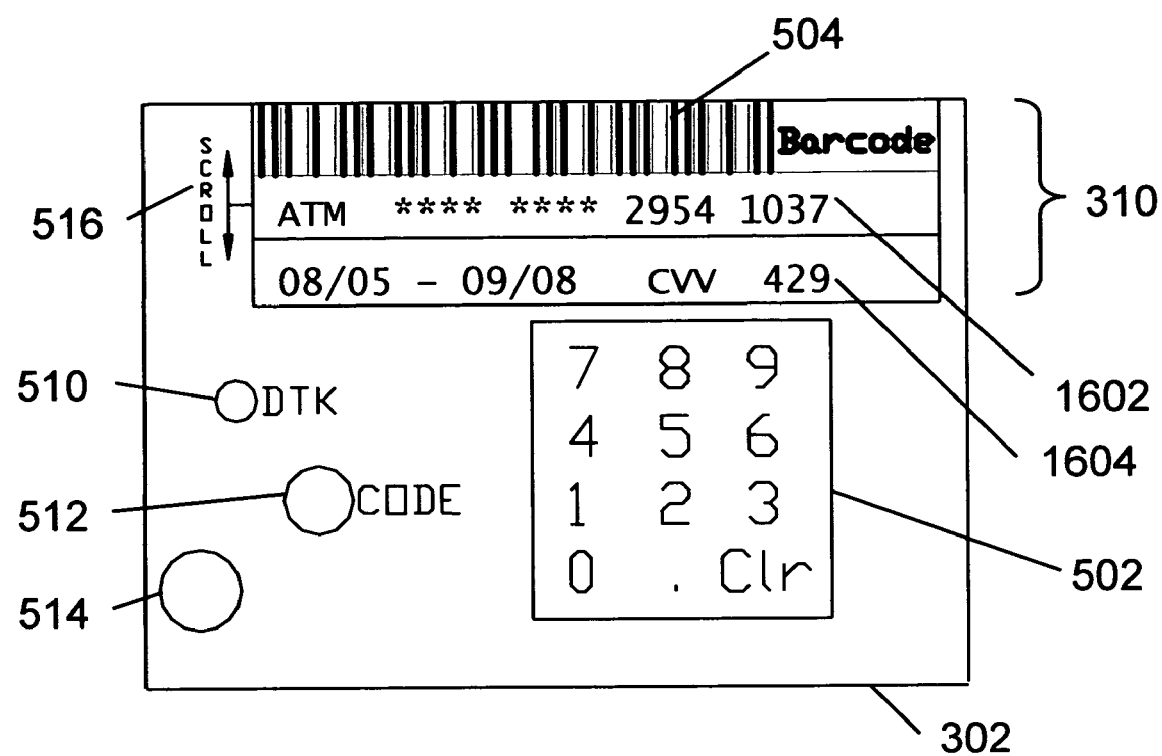
FIG. 16 illustrates the computing device of FIG. 5 with an ATM (Automatic Teller Machine) transaction selected.

FIG. 16 illustrates the computing device of FIG. 5 with an ATM (Automatic Teller Machine) transaction selected.

Figure 17A:
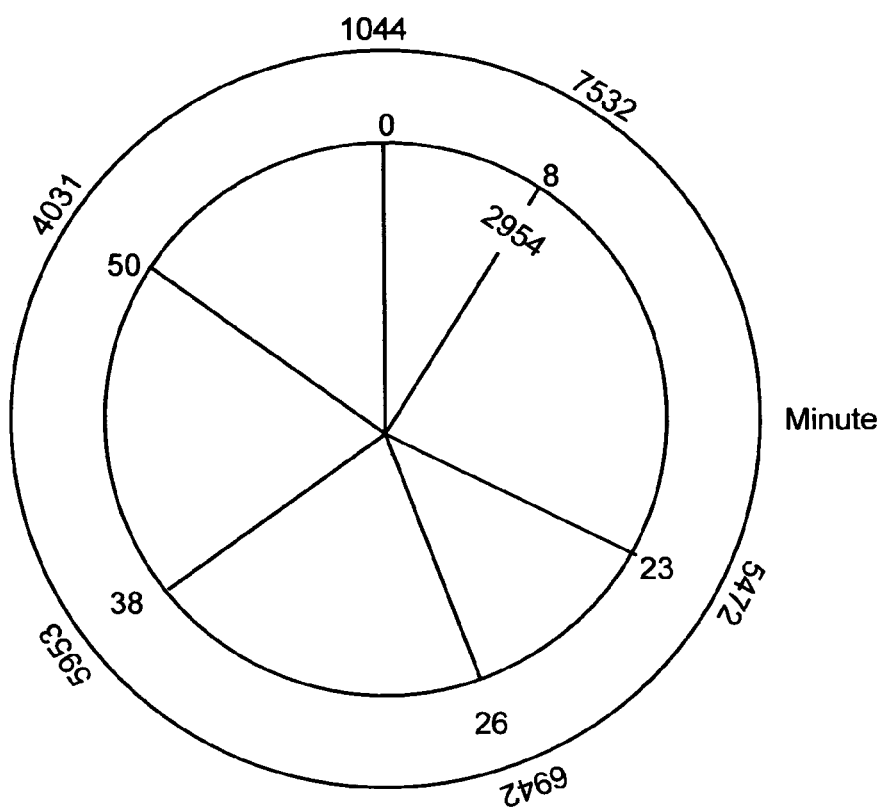
FIGS. 17A and 17B illustrate the code minute and code hour tables for the ATM transaction of FIG. 16.
Figure 17B:
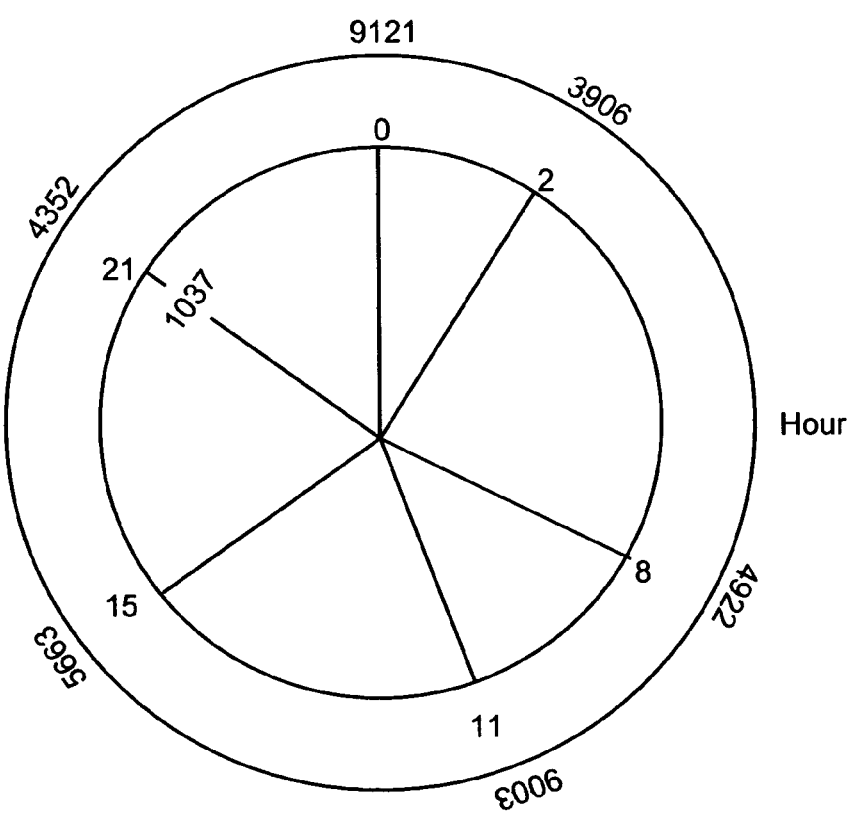

FIGS. 17A and 17B illustrate the code minute and code hour tables for the ATM transaction of FIG. 16. Note that the clock tables are unique for the ATM. The clock tables may further be unique for each cardholder or computing device.

Figure 18:
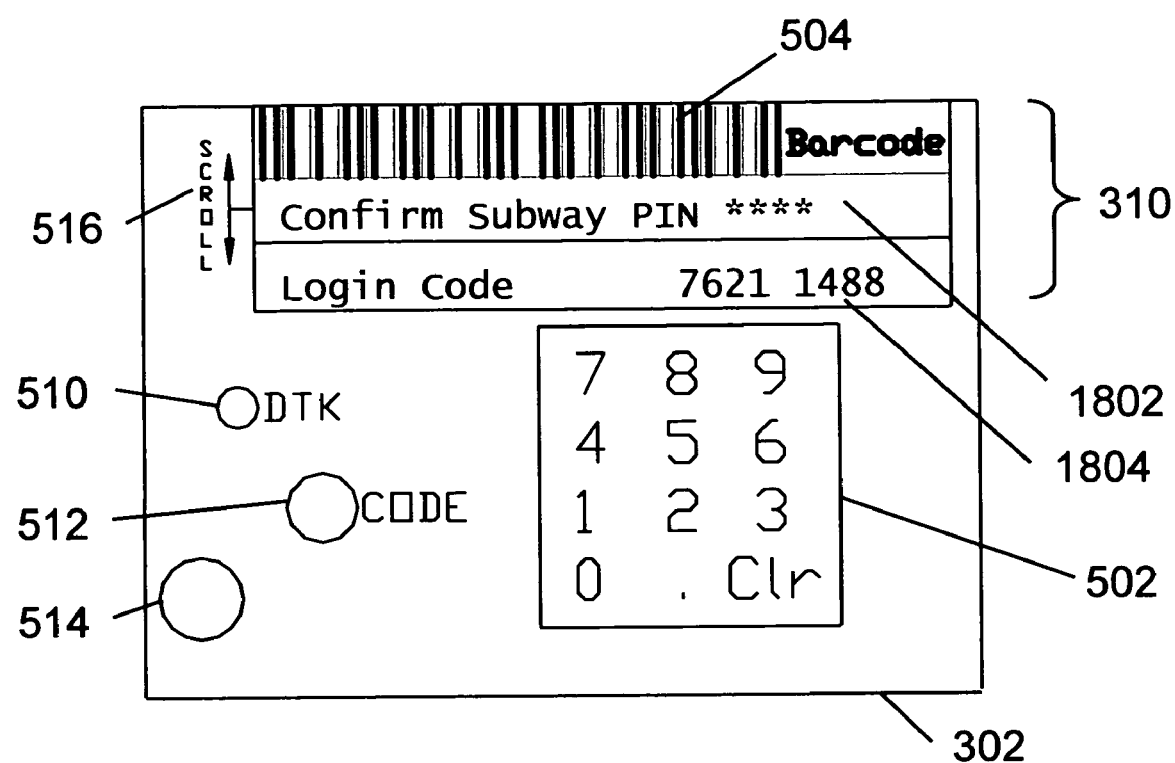
FIG. 18 illustrates the computing device of FIG. 5 with a subway fare transaction selected.

FIG. 18 illustrates the computing device of FIG. 5 with a subway fare transaction selected. The computing device has particular benefits for subway fares and other small transactions as further described in this disclosure.

Figure 19A:
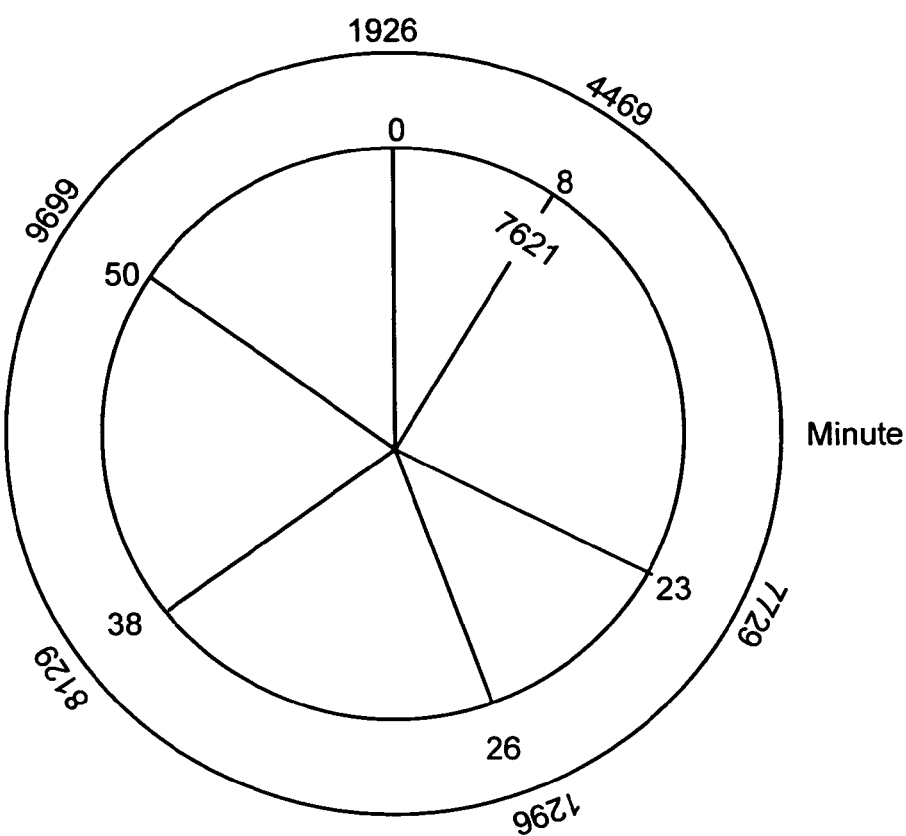
FIGS. 19A and 19B illustrate the code minute and code hour tables for the subway fare transaction of FIG. 18.
Figure 19B:
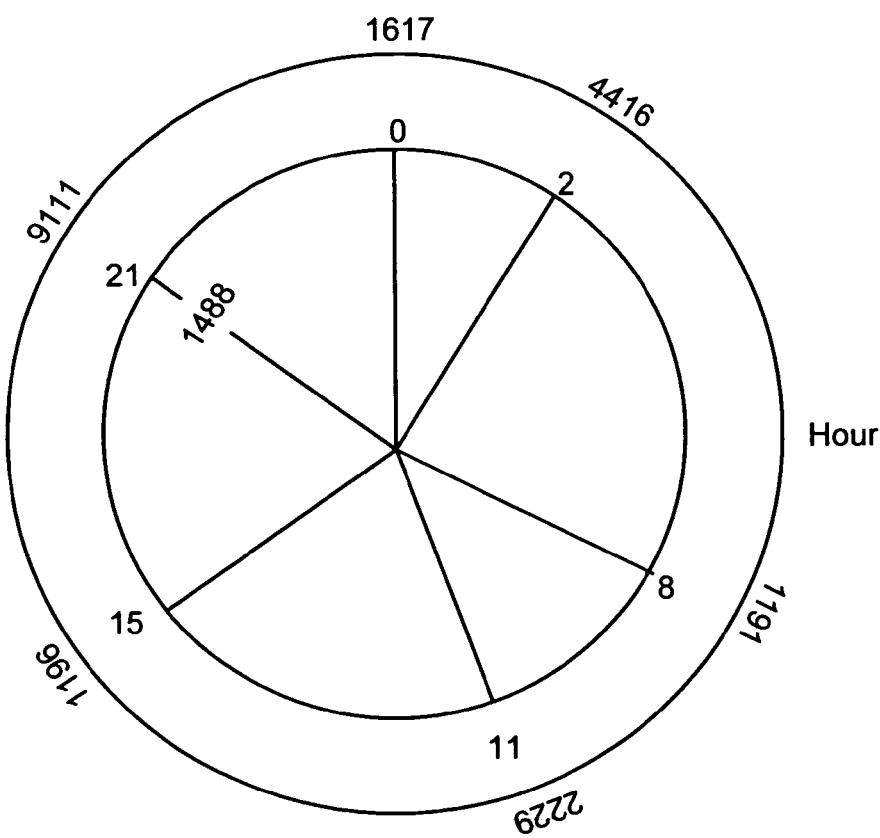

FIGS. 19A and 19B illustrate the code minute and code hour tables for the subway fare transaction of FIG. 18. Note that the clock tables are unique for the subway fare.

Small Purchases

In one embodiment of the invention, small transactions may be made instantaneously by postponing bank validation. Bank validation and account reconciliation may be delayed and performed in a batch, for example, once each day for all transactions occurring during the previous twenty-four hours. Other time intervals may be selected. Since the transaction is a small amount, bank and merchant risk is limited, permitting faster transaction time by delaying the validation and account reconciliation. Using the time dependent CVV code 114 as disclosed herein, the merchant records the account time along with the card number and time dependent CVV to have sufficient information for the bank to validate the time dependent CVV 114 and transaction. The recording of all information may be automatic by the merchant's terminal. Fast transactions speed sales and handling of customers through lines at such establishments as fast food restaurants, subway turnstiles, tollbooths and others.

As a further limitation on risk, the cell phone terminal may limit small transactions to some number, for example, ten per day. The small transaction amount may be limited to some predetermined value, for example, twenty-five dollars. Other numbers or values may be set. The number and value may be set in accordance with the purchaser's FICO score and/or past payment history or other factors. Because the device is networked, preferably to a cell phone network, the small transaction feature and limits may be set dynamically at anytime by the bank equipment calling the cell phone to automatically set feature limits and/or to enable and disable the feature. Further, if the small transaction feature were disabled, the device may still permit normal transactions requiring validation for each purchase.

Two Readings

The present invention may further speed sales transactions by allowing two readings of the credit card information. For example, for a subway payment, the cell phone's credit card module may be activated and scanned by a barcode reader upon first entering the subway terminal. This may be done while walking past. The reader will send the information for processing, which may take ten seconds. By the time the turnstile is reached, the account will have been verified and a second scanning of the barcode may authorize entry.

In a second example at a grocery store, the cell phone's barcode may be scanned just prior to unloading food items at the checkout. By the time checkout is completed, the card may be activated and the cashier may provide the sales receipt without delay.

In a third example at fast food restaurant, the barcode may be read at order entry and may be fully approved before order pickup.

In a further embodiment, the barcode may be read upon entering an establishment to authorize the credit card to a certain credit limit. Upon checkout the flatbed scanner will automatically complete the transaction by interfacing with the cell phone. This process may be better understood by the following example:

When the cardholder enters a convenience store and runs the activated cell phones display over a barcode reader the card details will be sent to banks transaction center for activation. By the time the cardholder has completed shopping, the bank's transaction center will have returned an authorization with a credit limit to the merchants POS (Point of Sale) system. When the cardholder arrives at the checkout counter, the flatbed barcode scanner will recognize the cell phone device by the barcode displayed and cause the POS terminal to beep or light up a LED to notify the attendant that the cardholder has been approved with the dollar amount available. The flat bed scanner may include a CCD (charge coupled device) for reading the barcode.

After the store attendant has completed ringing up the items, the dollar amount from that purchase will be credited to the merchant's account and debited from the cardholder's account.

The flatbed scanner will then output a barcode containing the total dollar amount and store name, which will be read by the cell phones camera. The cell phones software will update the database including the dollar amount remaining in the credit or debit account and the merchant's name. This will allow the cardholder to keep tract of the account. The process would work the same way in other situations, for example, in the subway where there is no attendant.

Conclusion

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

The flow diagrams depicted herein are exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A system for validating a financial transaction between a merchant and a customer comprising:
a personal computing device, said personal computing device comprising a code generating algorithm, said code generating algorithm generating an encrypted verification code based on a transaction amount for said financial transaction, and said encrypted verification code further based on a customer identity number verifying the identity of said customer; said encrypted verification code generated using code generating parameters known to a transaction center, said encrypted verification code transmitted to said transaction center along with a customer account number and said transaction amount;
said transaction center comprising:
a computer, said computer comprising:
a database, said database comprising a plurality of accounts and associated code generating parameters unique to each account of said plurality of accounts relative to the code generating parameters for another account of said plurality of accounts, said code generating parameters protected from disclosure to said merchant, said plurality of accounts including a customer account designated by said customer account number; and
a validation algorithm, said validation algorithm utilizing said code generating parameters associated with said customer account together with said encrypted verification code to validate said customer identity number and said transaction amount for said financial transaction.

2. The system of claim 1, further including a first clock providing a first measurement of time at said personal computing device, and a second clock providing a second measurement of time at said transaction center, wherein said code generating algorithm further utilizes said first measurement of time to generate said encrypted verification code and said validation algorithm further utilizes said second measurement of time to validate said customer identity number and said transaction amount for said financial transaction.

3. The system of claim 1, further including a first clock providing a first measurement of time at said personal computing device, wherein said code generating algorithm further utilizes said first measurement of time to generate said encrypted verification code, said first measurement of time being communicated to said transaction center, and said validation algorithm further utilizes said first measurement of time to validate said customer identity number and said transaction amount for said transaction.

4. The system of claim 1, wherein said customer identity number is a personal identification number entered in said personal computing device by said customer.

5. The system of claim 1, further including a fingerprint reader in said personal computing device, and said personal computing device provides said customer identity number after said fingerprint reader correctly matches a fingerprint.

6. The system of claim 1, further including a means for said customer inputting an indication of a duplicate transaction, and said code generating algorithm further includes said indication of a duplicate transaction in the encrypted verification code.

7. The system of claim 1, wherein the length of the encrypted verification code is three or four characters.

8. The system of claim 1, further including card processing equipment at a site of said merchant, said card processing equipment being designed to handle credit cards having a fixed verification code, wherein said encrypted verification number is communicated to said transaction center using said card processing equipment.

9. The system of claim 1, wherein the account number, customer identity number, and code generating parameters are provided to the personal computing device via a communication network prior to said transaction.

10. The system of claim 1, wherein the account number, customer identity number, and code generating parameters are issued and activated using electronic communications, without requiring a physical plastic card embodiment.

11. A method for validating a transaction between a merchant and a customer comprising:
receiving an account number, a transaction amount, and a encrypted verification number at a transaction center;

retrieving a customer identity number and code generating parameters from a memory in accordance with said account number;

verifying said customer identity number and said transaction amount, by applying said code generating parameters to said customer identity number and said transaction amount to generate a result and comparing the result to said encrypted verification number;

said transaction amount having been provided to said customer by said merchant and entered into a computing device to generate said encrypted verification number, said encrypted verification number generated based on said customer identity number and said transaction amount, said encrypted verification number generated by a code generating algorithm having code generating parameters unique to said computing device relative to other code generating parameters in other computing devices, and said code generating parameters being known to said transaction center and protected from disclosure to said merchant;

said account number and said encrypted verification number having been provided to said merchant and reported to said transaction center for transaction validation.

12. The method of claim 11, wherein the account number is one from the group consisting of a credit card number, a debit card number, a bank account number, an account login number, and an automatic teller machine account number.

13. The method of claim 11, wherein the step of generating said encrypted verification number comprises the step of utilizing a time value in a calculation of said encrypted verification number.

14. The method of claim 13, wherein the step of utilizing a time value comprises the steps of:

reading a coded time value from a table of coded time values, said table of coded time values providing a known correspondence between a clock time and a corresponding coded time value corresponding to said clock time; said table of coded time values being known to said transaction center and protected from disclosure to the public and to said merchant; said table of coded time values being different from other tables of coded time values residing in said other computing devices; and utilizing said coded time value to generate said encrypted verification number.

15. The method of claim 14, wherein the step of utilizing said coded time value comprises the steps of:

utilizing said coded time value as an index to find a selected multiplier value from a table of multiplier values, said table of multiplier values being known to said transaction center and protected from disclosure to the public and to said merchant; said table of multiplier values being different from other tables of multiplier values residing in said other computing devices;

multiplying said transaction amount by said selected multiplier value to generate a computed number, and utilizing said computed number in the generation of said encrypted verification number.

16. The method of claim 11, adapted to rapid transaction completion by including the steps of:

providing said account number to said merchant for validation to a credit limit before completing shopping activities;

completing said shopping activities while waiting for approval of said credit card;

completing said transaction following the completing of shopping activities without further waiting for approval of said transaction.

17. The method of claim 11, further comprising the steps of:

determining that said transaction is for a value less than a predetermined amount limit;

providing said account number and said encrypted verification number to said merchant;

recording at said merchant terminal said account number, said encrypted verification number, and said time of transaction;

approving said transaction at said merchant terminal without approval from said transaction center, said approving being at a transaction approval time;

reconciling accounts between said merchant and said transaction center at a time after said transaction approval time by providing said account number, said encrypted verification number, and said time of transaction to said transaction center.

18. The method of claim 17, further including the step of:

determining that the number of transactions in a time interval that are less than said predetermined amount limit is less than a transaction count limit per said time interval.

19. The method of claim 18, wherein the predetermined amount limit is twenty five dollars, and the transaction count limit is ten, and the time interval is one day.

* * * * *